US012076871B1

(12) United States Patent
Hu

(10) Patent No.: US 12,076,871 B1
(45) Date of Patent: Sep. 3, 2024

(54) CARPET CUTTING DEVICE AND AUXILIARY DEVICE

(71) Applicant: Liyin Hu, Yuyao (CN)

(72) Inventor: Liyin Hu, Yuyao (CN)

( * ) Notice: Subject to any disclaimer, the term of this patent is extended or adjusted under 35 U.S.C. 154(b) by 0 days.

(21) Appl. No.: 18/314,388

(22) Filed: May 9, 2023

(51) Int. Cl.
*B26B 19/38* (2006.01)
*A47G 27/04* (2006.01)

(52) U.S. Cl.
CPC ...... *B26B 19/3813* (2013.01); *A47G 27/0487* (2013.01); *B26B 19/3853* (2013.01); *B26B 19/3886* (2013.01)

(58) Field of Classification Search
CPC . B26B 19/3813; B26B 19/3826; B26B 19/20; B26B 5/005; B26B 19/3886; B26B 19/3853; B26B 19/06; A45D 24/36; A45D 24/38; D06C 13/00; A47G 27/0487; A47G 27/0443
USPC ........................... D30/158, 159; 30/169–172
See application file for complete search history.

(56) References Cited

U.S. PATENT DOCUMENTS 1,628,421 A * 5/1927 Patenaude ............... B26B 19/20 30/200
2,720,695 A * 10/1955 Sabiers ................... B26B 21/08 30/34.05
2,916,820 A * 12/1959 Clark ...................... B26B 19/20 30/201
4,622,742 A * 11/1986 Lee ......................... B26B 21/04 30/55
7,647,699 B1 * 1/2010 Geile ...................... B26B 19/14 30/41
10,415,259 B2 * 9/2019 Jungklaus ........... E04F 21/1652
2013/0279967 A1 * 10/2013 Otto ................... A47G 27/0487 401/265
2018/0222068 A1 * 8/2018 Halmut ................... B26B 19/20
2021/0008740 A1 * 1/2021 Iaccarino ................ B26B 19/22

* cited by examiner

*Primary Examiner* — Laura M Lee
(74) *Attorney, Agent, or Firm* — Daniel M. Cohn; Howard M. Cohn

(57) ABSTRACT

A carpet cutting device and an auxiliary device, related to technical field of devices for cutting carpet, are provided. The carpet cutting device includes a cutting head and a driving motor. The driving motor is fixed at a rear end of the cutting head and is electrically connected to the cutting head. The cutting head includes a fixing shell and a blade assembly, the blade assembly is disposed on the fixing shell, auxiliary component mounting edge strips are respectively disposed on two sides of a top portion of the fixing shell. The auxiliary device for the carpet cutting device includes a base and a cutting head fastener. A slot is defined at one side of the base, and first fixing portions are disposed on two sides of the slot. The cutting head fastener includes an inclined surface, second fixing portions, and fixing devices.

12 Claims, 8 Drawing Sheets

CARPET CUTTING DEVICE AND AUXILIARY DEVICE

TECHNICAL FIELD

The present disclosure relates to a technical field of devices for cutting carpet, and in particular to a carpet cutting device and an auxiliary device.

BACKGROUND

Currently, carpet cutting devices each is generally equipped with an auxiliary device similar to a hair cutter when being in sale. Since a stressed area of the auxiliary device is small, the auxiliary device is difficult to ensure that a height by each cutting is the same. Moreover, hand-held postures of users may also easily affect the height by each cutting.

There is also an auxiliary device of a carpet cutting device having a bottom plate, a clamping tool of the auxiliary device processed by wood is disposed on the bottom plate, and the clamping tool clamps the carpet cutting device. The bottom plate, the clamping tool, and the carpet cutting device form a stable triangle after being assembled, so that a stressed area of the auxiliary device is larger, and a height between a cutting head of the carpet cutting device and a carpet is always kept the same when using the carpet cutting device. However, in such assembly process, a fixing device needs to be manually adjusted, which is tedious in installation and requires a certain operation ability. Moreover, the height by each cutting is difficult to ensure to be adjusted to a same height, and a situation that the cutting head of the carpet cutting device is skewed easily occurs to askew cut the carpet. Further, when using the carpet cutting device, a fastener of the clamping tool is easy to loosen by vibration of the carpet cutting device, which may result in displacement of the cutting head of the carpet cutting device.

SUMMARY

The present disclosure aims to provide a carpet cutting device and an auxiliary device to overcome the defects in the prior art, the auxiliary device is matched with the carpet cutting device, which is convenient for assembly and disassembly. Moreover, the carpet cutting device and the auxiliary device are always assembled by the same height and angle, thereby ensuring consistency of a cutting effect on a carpet.

In order to achieve above aims, the present disclosure provides a carpet cutting device, including a cutting head and a driving motor. The driving motor is fixed at a rear end of the cutting head and is electrically connected to the cutting head. The cutting head includes a fixing shell and a blade assembly, the blade assembly is disposed on the fixing shell, auxiliary component mounting edge strips are respectively disposed on two sides of a top portion of the fixing shell, and a first protrusion positioning block is disposed on a top portion of each of the auxiliary component mounting edge strips.

Furthermore, a second protrusion positioning block is further disposed on the top portion of each of the auxiliary component mounting edge strips, and a first positioning groove is defined between the first protrusion positioning block and the second protrusion positioning block.

Furthermore, the carpet cutting device further includes a handheld holding rod, the driving motor is disposed in the handheld holding rod, and a control switch is disposed on an outer surface of the handheld holding rod and is electrically connected to the driving motor.

Furthermore, an anti-slip sleeve pad is sleeved on the handheld holding rod, and a plurality of raised patterns are defined on the anti-slip sleeve pad.

The present disclosure further provides an auxiliary device, for matching with the carpet cutting device, including a base and a cutting head fastener. A slot is defined at one side of the base, and first fixing portions are disposed on two sides of the slot. The cutting head fastener includes an inclined surface, second fixing portions, and fixing devices, the inclined surface is configured to support the fixing shell, the second fixing portions are located at two sides of the inclined surface, and the fixing devices are configured to fix the fixing shell on the inclined surface. The cutting head fastener is fixed on the base, the inclined surface is aligned with the slot, and when the cutting head is fixed on the inclined surface, the blade assembly is located in the slot.

Furthermore, a first limiting portion is disposed at one end of an inner side surface of each of the second fixing portions, when the first limiting portion is installed in place, an outer side surface of the first protrusion positioning block abuts against the first limiting portion.

Furthermore, the fixing devices are limiting blocks disposed on the inner side surface of each of the second fixing portions, and a stop groove is defined between the first limiting portion and a corresponding one of the limiting blocks. A stop portion is disposed at a first end of each of the limiting blocks close to the first limiting portion, a guide portion is disposed at a second end of each of the limiting blocks, when the stop portion and the guide portion are installed in place, the first protrusion positioning block is located in the stop groove.

Furthermore, each of the fixing devices further includes an L-shaped groove and a locking elastic piece, the L-shaped groove is defined on the inner side surface of each of the second fixing portions, the locking elastic piece is located at a top portion of the L-shaped groove, and each of the limiting blocks is disposed on the locking elastic piece.

Furthermore, a concave groove is defined on an outer side surface of a connection of the locking elastic piece and each of the second fixing portions.

Furthermore, the fixing devices are a hook assembly disposed at a rear end of the inclined surface and are configured to fasten a rear end of the fixing shell.

Furthermore, a sliding groove is defined on an inner side of each of the second fixing portions.

Furthermore, the fixing devices are locking blocks disposed on the inner side surface of each of the second fixing portions.

Furthermore, an included angle between the inclined surface and the base is ranged from 23° to 28°.

Furthermore, an included angle between the inclined surface and the base is 25°.

Furthermore, first fixing holes are defined on the base, and second fixing holes corresponding to the first fixing holes are defined on a bottom portion of the cutting head fastener.

Furthermore, the cutting head fastener is made of acrylonitrile butadiene styrene (ABS) materials, or polyphenylene sulfide (PPS) materials, or poly-ether-ether-ketone (PEEK) materials.

Furthermore, the cutting head fastener includes a second limiting portion vertically disposed on a middle portion of a bottom portion of the cutting head fastener, a first horizontal supporting portion located at a first side of the second limiting portion and close to the blade assembly, and a second horizontal supporting portion located at a second side of the second limiting portion and close to the driving motor. The second limiting portion abuts against an inner side surface of the slot, the first horizontal supporting portion is located in the slot, and the second horizontal supporting portion is fixed on the base.

Furthermore, the first horizontal supporting portion and the second horizontal supporting portion are both hollow cavities, and a plurality of reinforcing ribs are disposed in the hollow cavities.

Compared with the prior art, the present disclosure has following beneficial effects.

First, the carpet cutting device of the present disclosure is simple in structure, the auxiliary component mounting edge strips are respectively disposed at two sides of a top portion of the cutting head, the first protrusion positioning block is disposed on the top portion of each of the auxiliary component mounting edge strips, or the first protrusion positioning block and the second protrusion positioning block are both disposed on the top portion of each of the auxiliary component mounting edge strips, and the first positioning groove is defined between the first protrusion positioning block and the second protrusion positioning, so as to match with the auxiliary device of the present disclosure for cooperation.

Second, the auxiliary device of the present disclosure is simple in structure, which is convenient to process, and may be flexibly assembled and disassembled, so as to solve technical problems that auxiliary devices are tedious to assemble and disassemble in the prior art. Moreover, the carpet cutting device and the auxiliary device are always assembled by the same height and angle, thereby ensuring consistency of the cutting effect of the carpet. And, flexible disassembly of the carpet cutting device and the auxiliary device is beneficial for trimming edge details after cutting the carpet after the carpet cutting device and the auxiliary device are disassembled.

BRIEF DESCRIPTION OF DRAWINGS

In order to more clearly illustrate embodiments of the present disclosure or technical solutions in the prior art, the drawings that need to be used in the embodiments or the prior art are briefly described below, and it is obvious that the accompanying drawings in the following description are merely some embodiments of the present disclosure, and those who skilled in the art may obtain other drawings according to these drawings without involving any inventive effort.

DETAILED DESCRIPTION

Figure 1:
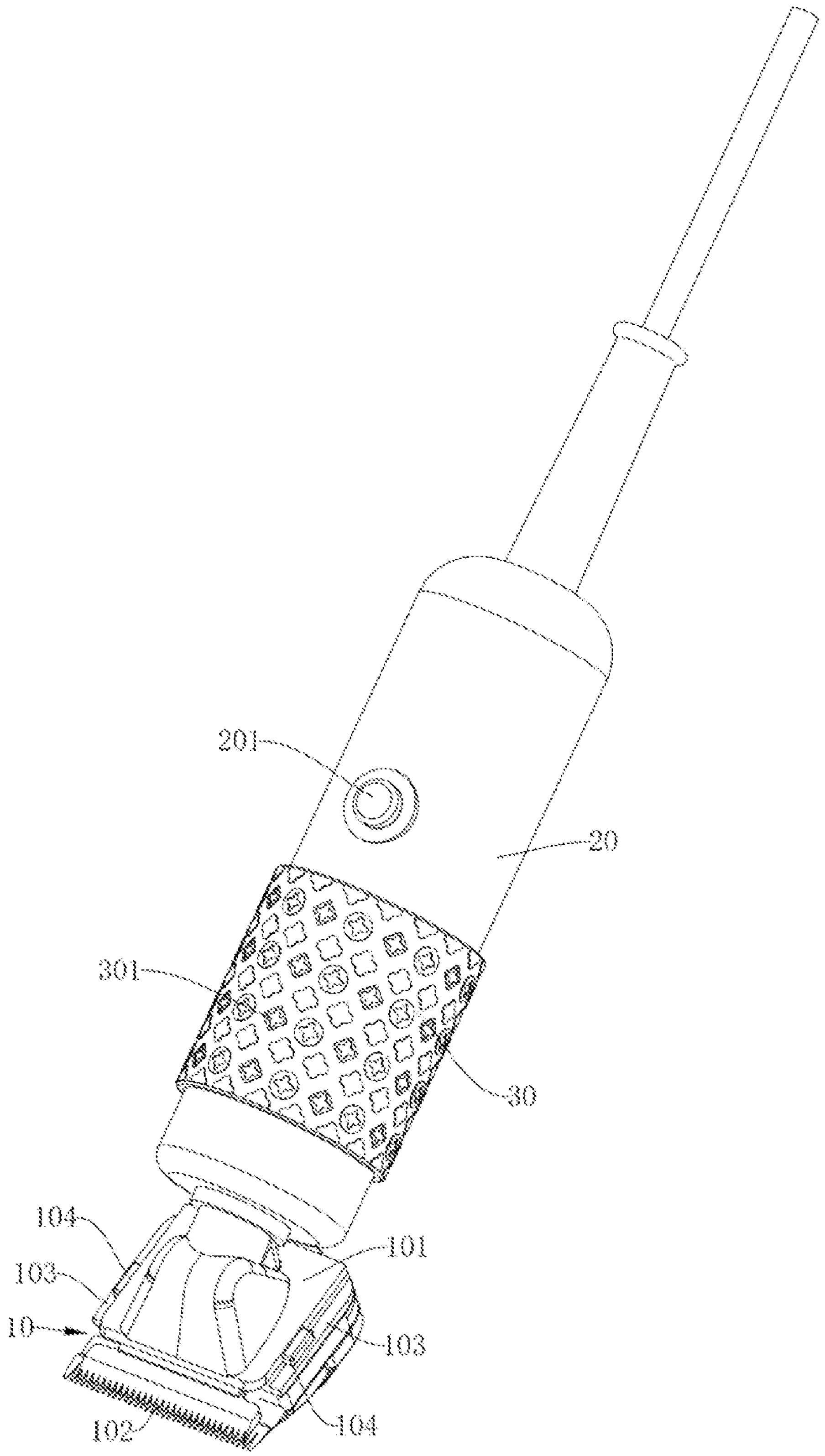
FIG. 1 is a structural schematic diagram of a carpet cutting device according to one embodiment of the present disclosure.

Technical solutions in embodiments of the present disclosure are clearly and completely described below with reference to the accompanying drawings in the embodiments of the present disclosure. All other embodiments obtained by those who skilled in the art based on the embodiments of the present disclosure without creative efforts shall fall within the protection scope of the present disclosure.

It should be noted that all directional indications in the embodiments of the present disclosure, such as up, down, left, right, front, and back, only used to explain the relative position relationship, the motion situation, etc. between the components under a certain specific posture (as shown in the drawings), and if the specific posture changes, the directional indication also changes accordingly.

In the present disclosure, unless expressly specified and limited thereto, the terms “connected”, “fixed”, etc. should be broadly understood, for example, “connected” may be a fixed connection or a detachable connection, or may be integrated, or may be a mechanical connection or an electrical connection, or may be a direct connection or an indirect connection by means of an intermediate medium, or may be a connection between two elements or an interaction relationship between two elements, unless explicitly defined otherwise. For those who skilled in the art, the specific meanings of the above terms in the present disclosure may be understood according to specific situations.

In addition, if the embodiments of the present disclosure relate to descriptions such as “first” and “second”, the descriptions of “first”, “second”, etc. are only used for descriptive purposes, and cannot be understood as indicating or implying their relative importance or implicitly indicating the number of indicated technical features. Thus, the features defined with “first” and “second” may explicitly or implicitly include at least one of the features. In addition, the meaning of “and/or” appearing in the entire text includes three parallel solutions, and uses “A and/or B” as an example, including solution A, or solution B, or solutions A and B satisfied at the same time. Moreover, the technical solutions between the various embodiments may be combined with each other, but must be based on those who skilled in the art, and when the combination of the technical solutions is contradictory or cannot be implemented, it should be considered that the combination of the technical solutions does not exist, nor is within the protection scope of the present disclosure.

First Embodiment

Figure 2:
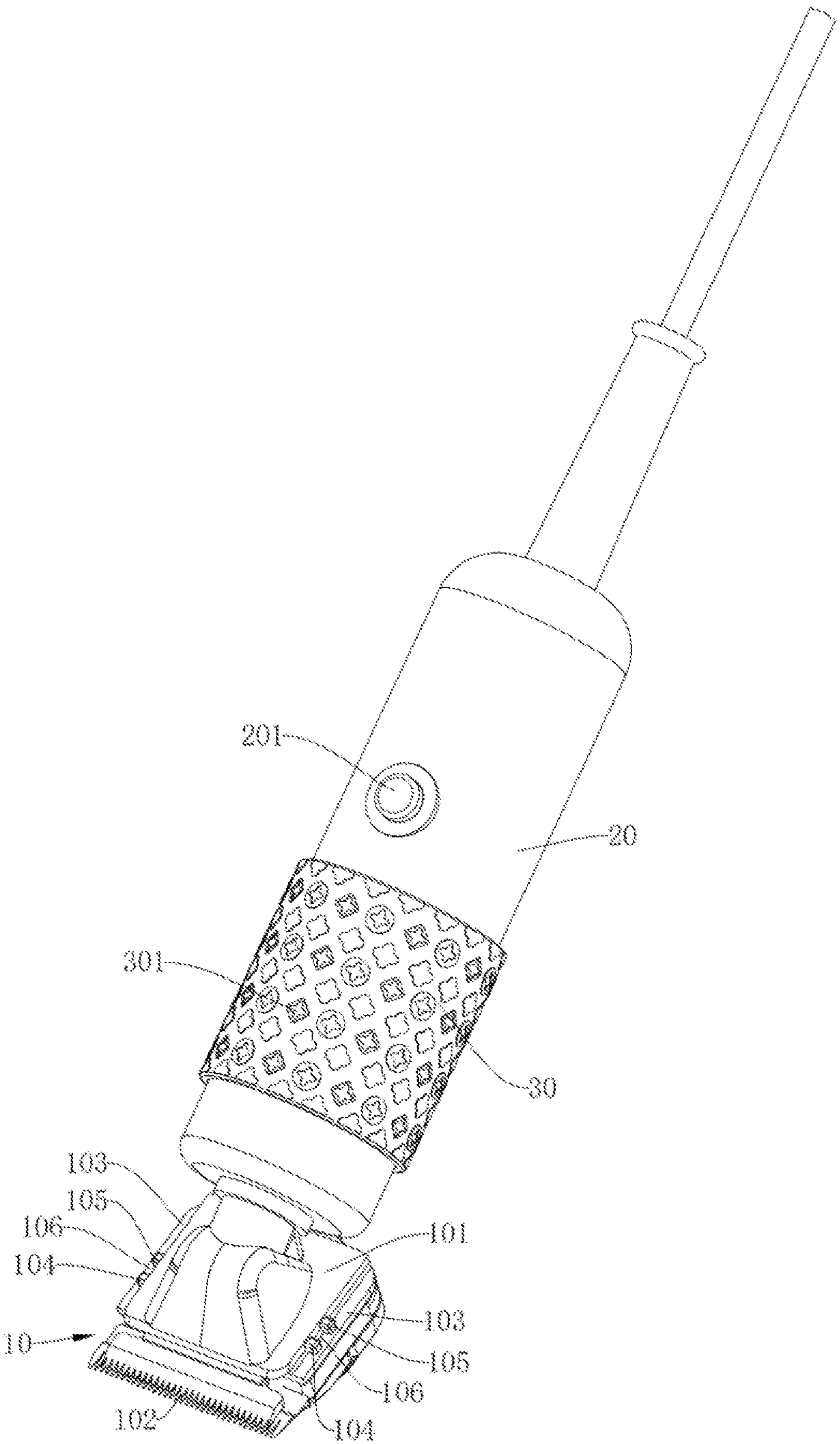
FIG. 2 is a structural schematic diagram of the carpet cutting device according to another embodiment of the present disclosure.
Figure 3:
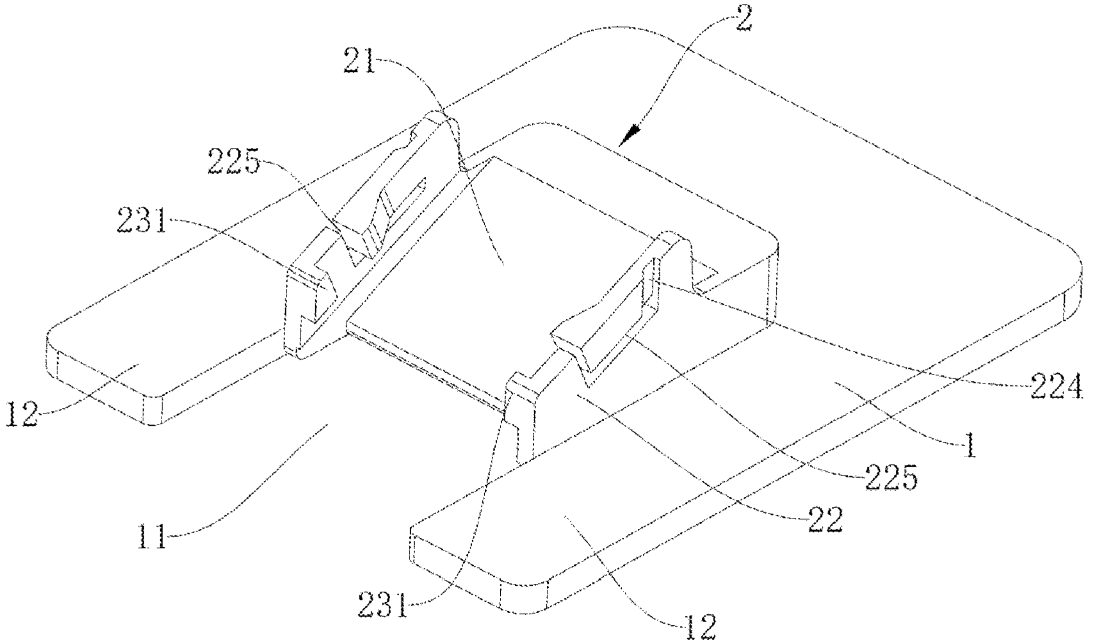
FIG. 3 is a structural schematic diagram of an auxiliary device according to one embodiment of the present disclosure.
Figure 4:
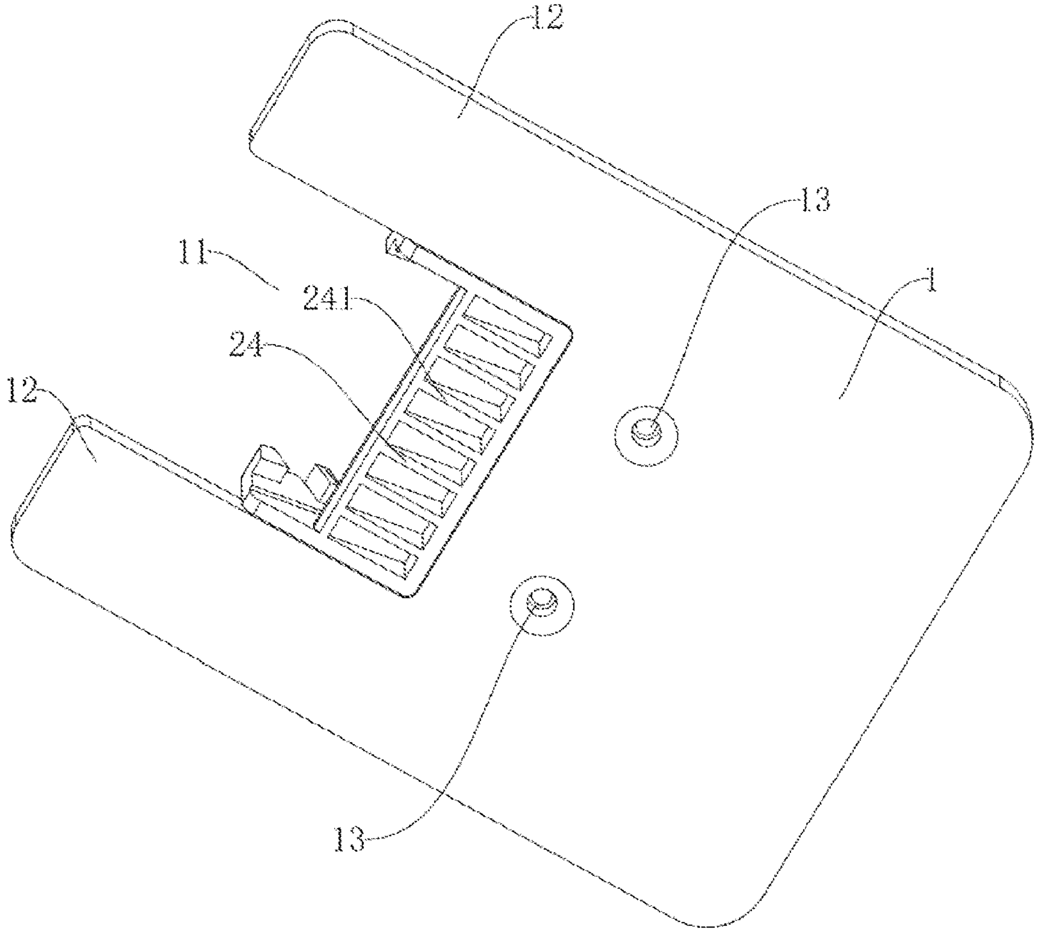
FIG. 4 is a structural schematic diagram of the auxiliary device represented in another angle according to one embodiment of the present disclosure.
Figure 5:
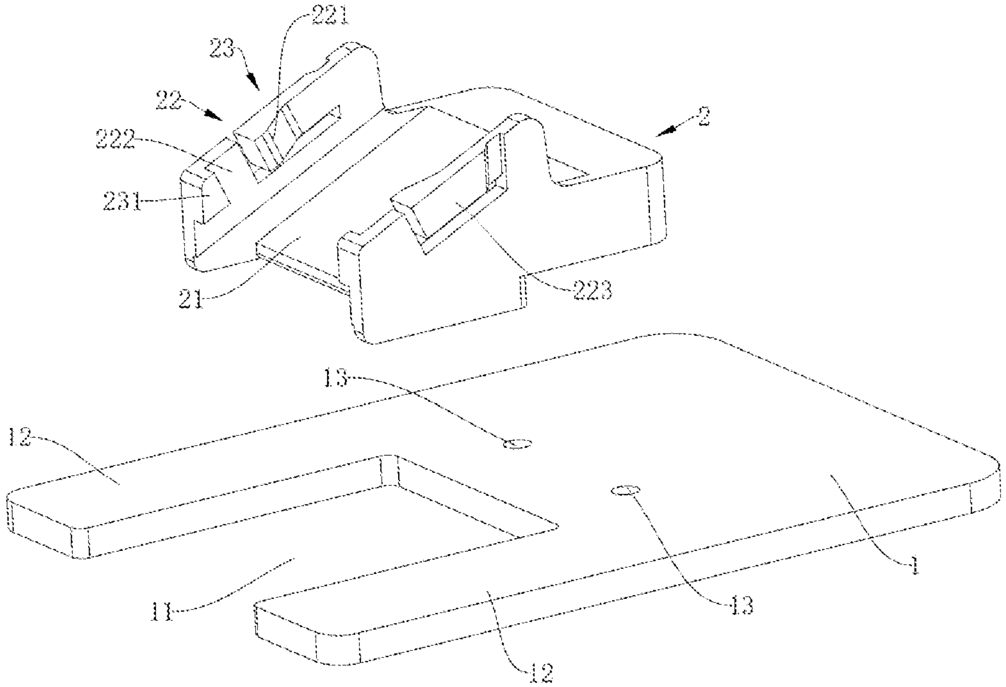
FIG. 5 is an exploded schematic diagram of the auxiliary device according to one embodiment of the present disclosure.
Figure 6:
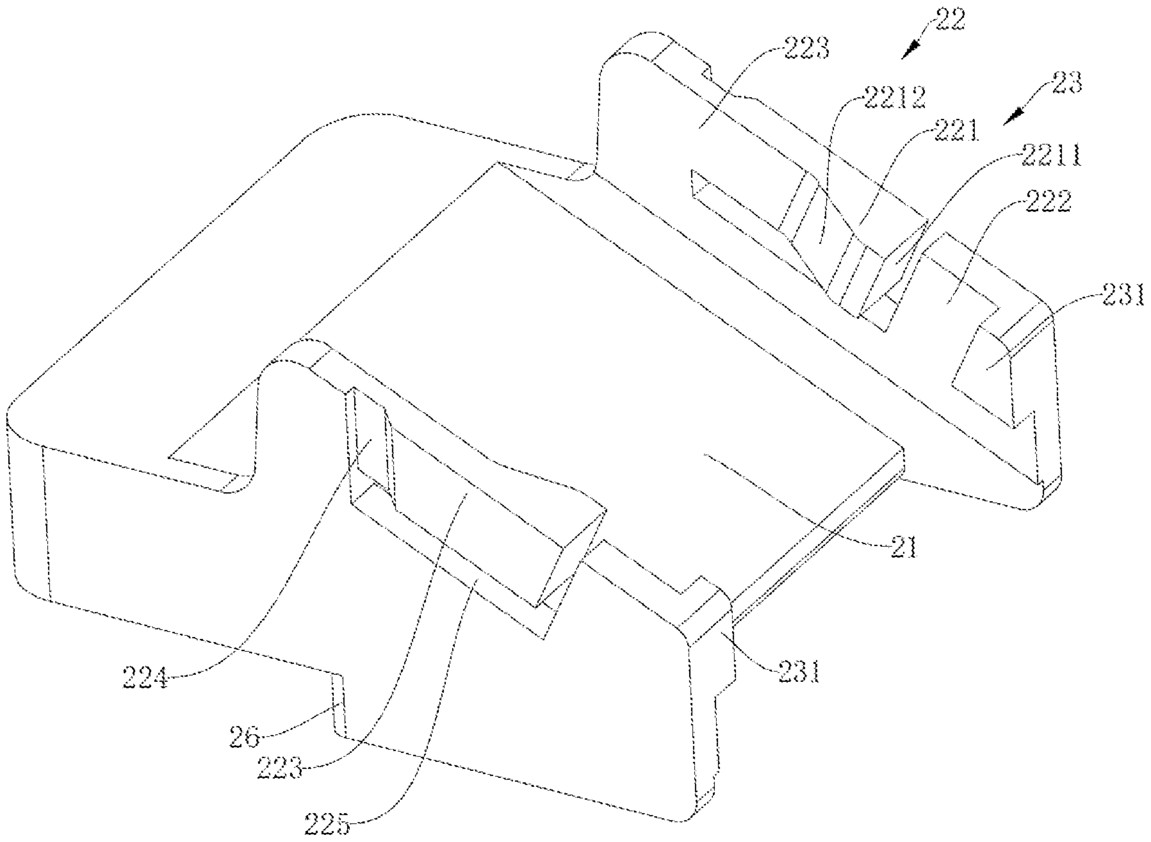
FIG. 6 is a structural schematic diagram of a cutting head fastener according to one embodiment of the present disclosure.
Figure 7:
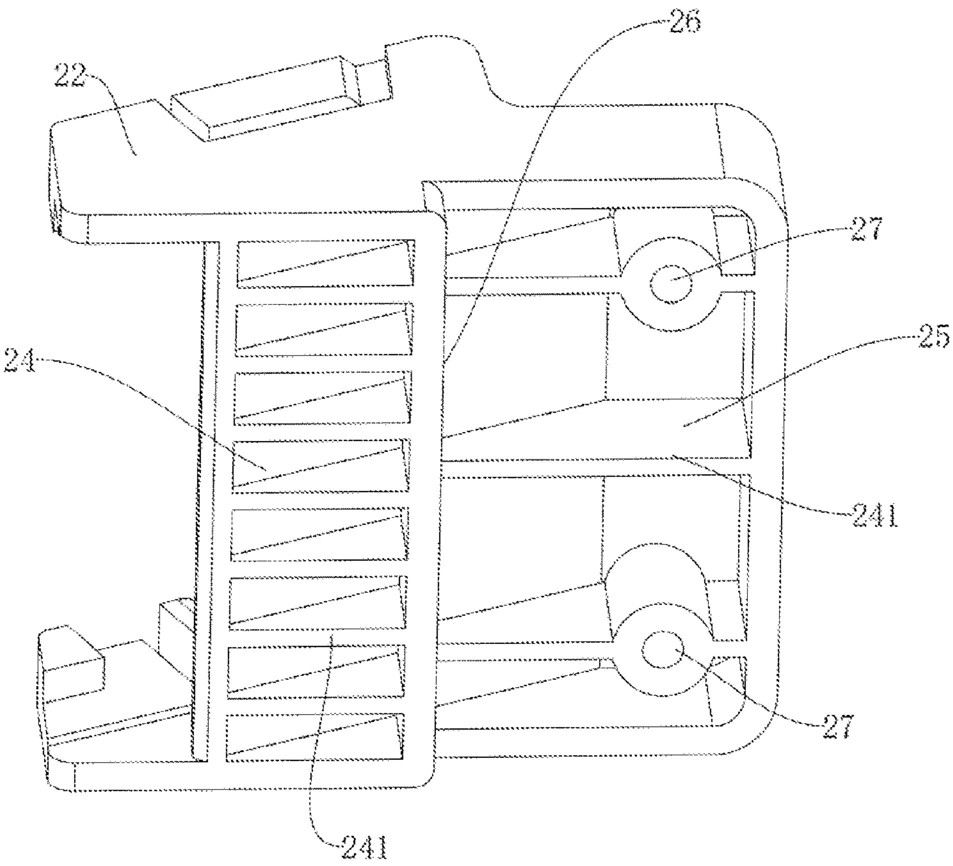
FIG. 7 is a structural schematic diagram of the cutting head fastener represented in another angle according to one embodiment of the present disclosure.
Figure 8:
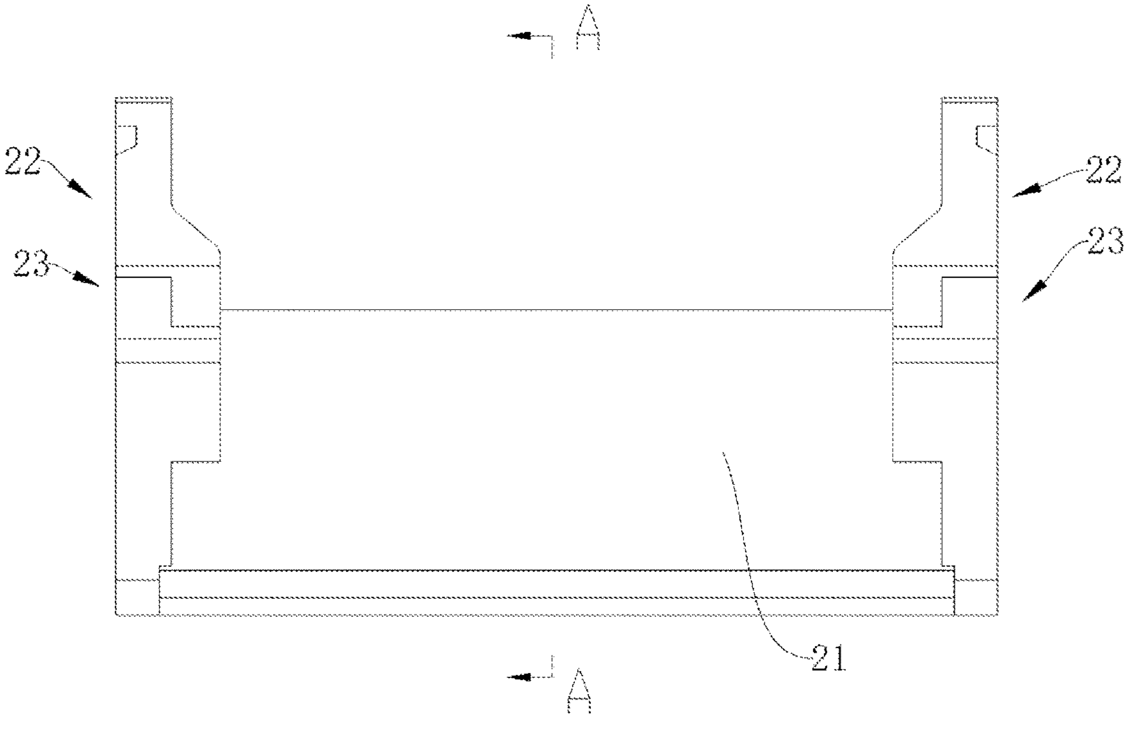
FIG. 8 is a schematic diagram of the cutting head fastener represented in a front elevational view according to one embodiment of the present disclosure.

As shown in FIGS. 1-2, the present disclosure provides a carpet cutting device, including a cutting head 10, a driving motor, and a handheld holding rod 20. The driving motor is disposed in the handheld holding rod 20, and a control switch 201 is disposed on an outer surface of the handheld holding rod 20 and is electrically connected to the driving motor. The driving motor is fixed at a rear end of the cutting head 10 and is electrically connected to the cutting head 10. The cutting head 10 includes a fixing shell 101 and a blade assembly 102, the blade assembly 102 is disposed on the fixing shell 101, auxiliary component mounting edge strips 103 are respectively disposed on two sides of a top portion of the fixing shell 101, and a first protrusion positioning block 104 is disposed on a top portion of each of the auxiliary component mounting edge strips 103.

As shown in FIG. 2, in another embodiment, a second protrusion positioning block 105 is further disposed on the top portion of each of the auxiliary component mounting edge strips 103, and a first positioning groove 106 is defined between the first protrusion positioning block 104 and the second protrusion positioning block 105. As an improvement, an anti-slip sleeve pad 30 is sleeved on the handheld holding rod 20, and a plurality of raised patterns 301 are defined on the anti-slip sleeve pad 30. The plurality of the raised patterns 301 improves appearance attractiveness of carpet cutting carpet of the present disclosure, and further plays a role in brand identifier for enhancing brand effects.

Second Embodiment

As shown in FIGS. 3-10, the present disclosure further provides an auxiliary device, for matching with the carpet cutting device of the first embodiment, including a base 1 and a cutting head fastener 2. A slot 11 is defined at one side of the base 1, and first fixing portions 12 are disposed on two sides of the slot 11. The cutting head fastener includes an inclined surface 21, second fixing portions 23, and fixing devices 22, the inclined surface 21 is configured to support the fixing shell 101, the second fixing portions 23 are located at two sides of the inclined surface 21, and the fixing devices 22 are configured to fix the fixing shell 101 on the inclined surface 21. The cutting head fastener 2 is fixed on the base 1, the inclined surface 21 is aligned with the slot 11, and when the cutting head 10 is fixed on the inclined surface 21, the blade assembly 102 is located in the slot 11. As an improvement, first fixing holes 13 are defined on the base 1, and second fixing holes 27 corresponding to the first fixing holes 13 are defined on a bottom portion of the cutting head fastener 2. Bolts or screws pass through the first fixing holes 13 and are fixed in the second fixing holes 27, so as to fix the cutting head fastener 2 and the base 1 with each other. In addition, the cutting head fastener 2 includes a second limiting portion 26 vertically disposed on a middle portion of a bottom portion of the cutting head fastener 2, a first horizontal supporting portion 24 located at a first side of the second limiting portion 26 and close to the blade assembly 102, and a second horizontal supporting portion 25 located at a second side of the second limiting portion 26 and close to the driving motor. The second limiting portion 26 abuts against an inner side surface of the slot 11, the first horizontal supporting portion 24 is located in the slot 11, and the second horizontal supporting portion 24 is fixed on the base 11. The second limiting portion 16 is convenient for positioning the cutting head fastener 2 and the base 1 when the cutting head fastener 2 and the base are fixed with each other. In addition, a horizontal height of the first horizontal supporting portion 24 and a horizontal height of the second horizontal supporting portion 25 are inconsistent, and when the second horizontal supporting portion 25 is fixed on the base 1, a bottom portion of the first horizontal supporting portion 24 is flush with a bottom portion of the base 1, which is convenient for assembly and further convenient for cutting the carpet in the same height when the cutting head 10 cuts the carpet. The first horizontal supporting portion 24 and the second horizontal supporting portion 25 of the present disclosure are both hollow cavities, and a plurality of reinforcing ribs 241 are disposed in the hollow cavities, which improves a heat dissipation effect and ensures product quality while reducing a weight of the cutting head fastener 2.

In the embodiment, a first limiting portion 231 is disposed at one end of an inner side surface of each of the second fixing portions 23, the fixing devices 22 are limiting blocks 221 disposed on the inner side surface of each of the second fixing portions 23, and a stop groove 222 is defined between the first limiting portion 231 and a corresponding one of the limiting blocks 221. A stop portion 2211 is disposed at a first end of each of the limiting blocks 221 close to the first limiting portion 231, a guide portion 2212 is disposed at a second end of each of the limiting blocks 221.

Figure 10:
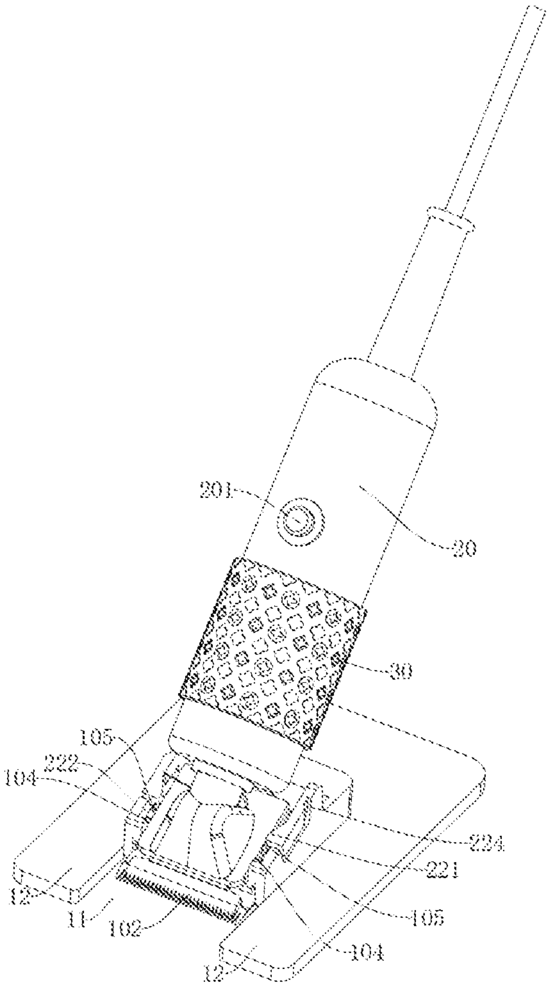
FIG. 10 is an assembly schematic diagram of the carpet cutting device and the auxiliary device according to one embodiment of the present disclosure where the carpet cutting device is matched with the auxiliary device for cooperation.

As shown in FIG. 10, when assembling the carpet cutting device and the auxiliary device, the cutting head 10 slides from a rear end of the inclined surface 21 onto the inclined surface 21, and the first protrusion positioning block 103 pushes a corresponding one of the limiting blocks 221. When the stop portion 2211 and the guide portion 2212 is assembled in place, the first protrusion positioning block 103 is fixed in the stop groove 222, a first surface of the protrusion positioning block 103 abuts against the first limiting portion 231, a second surface of the protrusion positioning block 103 abuts against the corresponding one of the limiting blocks 221, the guide portion 2212 is convenient for the first protrusion positioning block 104 to slide into the stop groove 222. At this time, the fixing shell 101 is limited to move left and right on the inclined surface 21, and the top portion of each of the auxiliary component mounting edge strips 103 may abut against bottom portions of the first limiting portion 231 and the corresponding one of the limiting blocks 221, as so to limit the fixing shell 101 to move up and down on the inclined surface 21, thereby stably fixing the fixing shell 101 on the inclined surface 21. When the carpet cutting device and the auxiliary device need to be disassembled, the cutting head 10 is pulled out from the rear end of the inclined surface 21, the first protrusion positioning block 104 pushes the corresponding one of the limiting blocks 221, so as to disassemble the cutting head 10 and the auxiliary device, and when such structure is used for assembling, the second fixing portions 23 need a certain elastic resilience, so that plastic having good toughness needs to be adopted for the second fixing portions 23.

In another embodiment, when the first protrusion positioning block 104 is installed in place, the first protrusion positioning block 104 and the second protrusion positioning block 105 are both located in the stop groove 22, an outer side surface of the first protrusion positioning block 104 abuts against the first limiting portion 231, and an outer side surface of the second protrusion positioning block 105 abuts against the corresponding one of the limiting blocks 221.

As an improvement, each of the fixing devices 22 further includes an L-shaped groove 225 and a locking elastic piece 223, the L-shaped groove 225 is defined on the inner side surface of each of the second fixing portions 23, the locking elastic piece 223 is located at a top portion of the L-shaped groove 225, and each of the limiting blocks 221 is disposed on the locking elastic piece 223. When the cutting head 10 is fixed on the inclined surface 21, the locking elastic piece 223 may deform to improve elastic resilience of the second fixing portions 23, so that the first protrusion positioning block 104, or the first protrusion positioning block 104 with the second protrusion positioning block 105 pass through the corresponding one of the limiting blocks 221 and are fixed in the stop groove 222.

Further, a concave groove 224 is defined on an outer side surface of a connection of the locking elastic piece 223 and each of the second fixing portions 23, so as to improve a deformation effect of the locking elastic piece 223, and further be convenient for the first protrusion positioning block 104, or the first protrusion positioning block 104 with the second protrusion positioning block 105 to pass through the corresponding one of the limiting blocks 221 and to fix in the stop groove 222.

Since more structures need to be processed on the cutting head fastener 2, the locking elastic piece 223 is bounced off by the cutting head 10 when the cutting head 10 slides onto the inclined surface 21 from the rear end of the inclined surface 21, and is recovered after sliding into the bottom portion, so that plastic having very good toughness is needed. In the embodiment, the cutting head fastener 2 is made of acrylonitrile butadiene styrene (ABS) materials, or polyphenylene sulfide (PPS) materials, or poly-ether-ether-ketone (PEEK) materials. Certainly, in other embodiments, the cutting head fastener 2 may also be made of other plastic materials having good toughness, which is not limited hereto.

Figure 9:
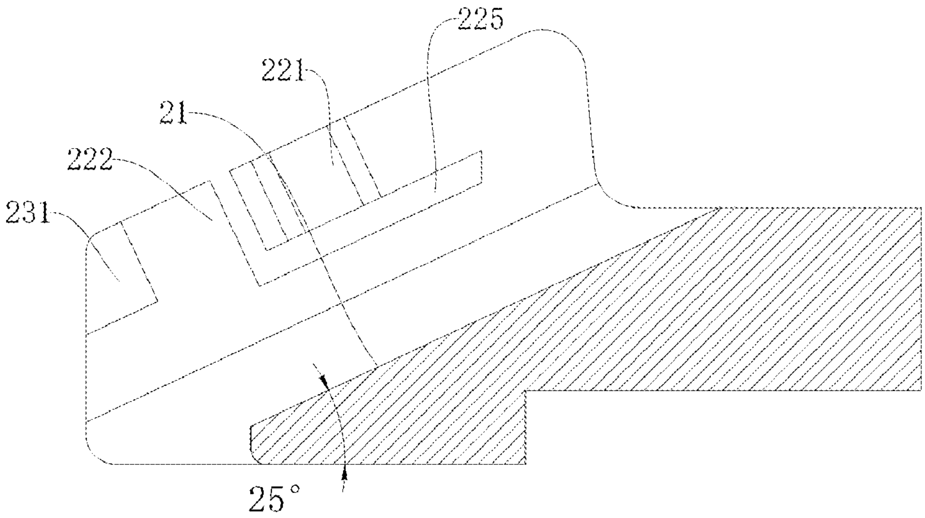
FIG. 9 is a cross-sectional view taken from the line A-A shown in FIG. 8.

As shown in FIG. 9, as an improvement, an included angle between the inclined surface 21 and the base 1 is ranged from 23° to 28°. In particular, the included angle between the inclined surface 21 and the base 1 is 25°, such angle is convenient for the cutting head to slide onto the inclined surface 21 from the rear end of the inclined surface 21 and is further convenient for cutting head 10 to operate.

Third Embodiment

Figure 11:
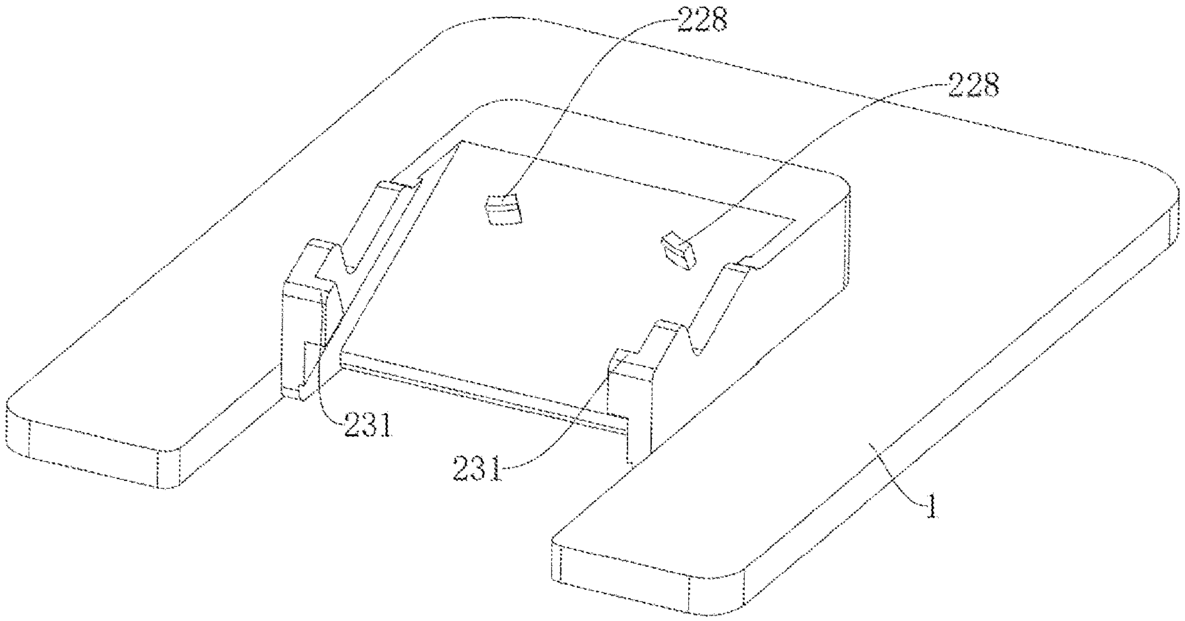
FIG. 11 is a structural schematic diagram of the auxiliary device according to the third embodiment of the present disclosure.
Figure 12:
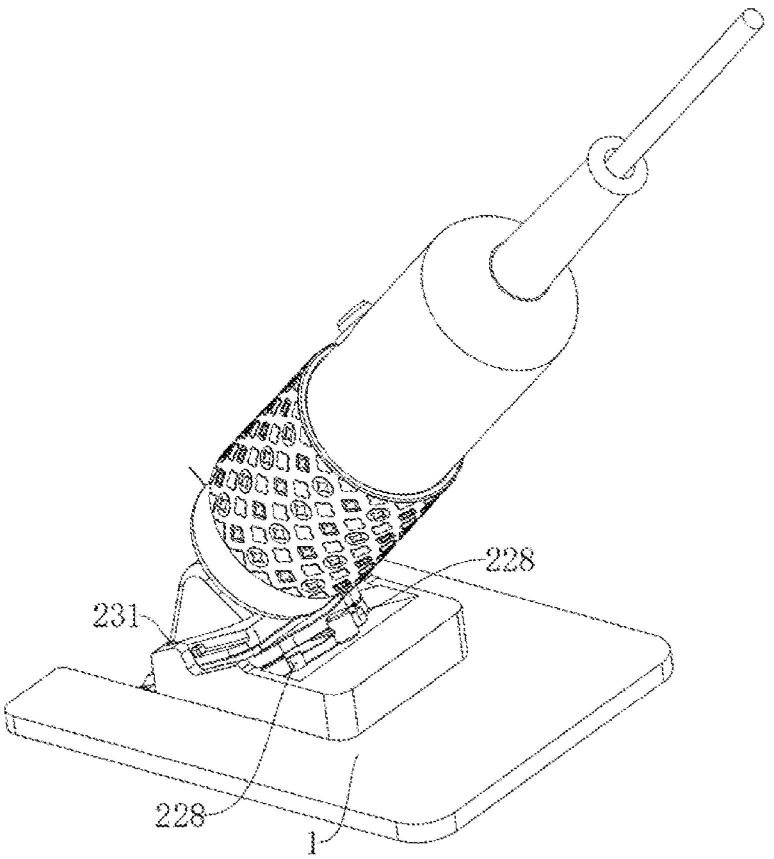
FIG. 12 is an assembly schematic diagram of the carpet cutting device and the auxiliary device according to the third embodiment of the present disclosure where the carpet cutting device is matched with the auxiliary device for cooperation.

As shown in FIG. 11-12, the present disclosure further provides another embodiment of the auxiliary device, the fixing devices 22 are a hook assembly 228 disposed at a rear end of the inclined surface 21 and are configured to fasten a rear end of the fixing shell 101. Remaining structures of the auxiliary device are the same as the second embodiment, and are not repeated.

The third embodiment is distinguished from the second embodiment in removing the locking elastic piece 223 and the limiting blocks 221. The first limiting portion 231 on each of the second fixing portions 23 is retained, and the hook assembly 228, configured to fasten the rear end of the fixing shell 101, is disposed at the rear end of the inclined surface 21. Moreover, a sliding groove is defined on an inner side of each of the second fixing portions 23.

Specifically, when assembling the carpet cutting device and the auxiliary device, the cutting head 10 is pressed up to down, and when the cutting head is pressed in place, the outer side surface of the first protrusion positioning block 104 may abut against the first limiting portion 231, a rear end of the cutting head 10 may be fastened by the hook assembly 228, so as to fix the cutting head on the inclined surface 21.

Fourth Embodiment

Figure 13:
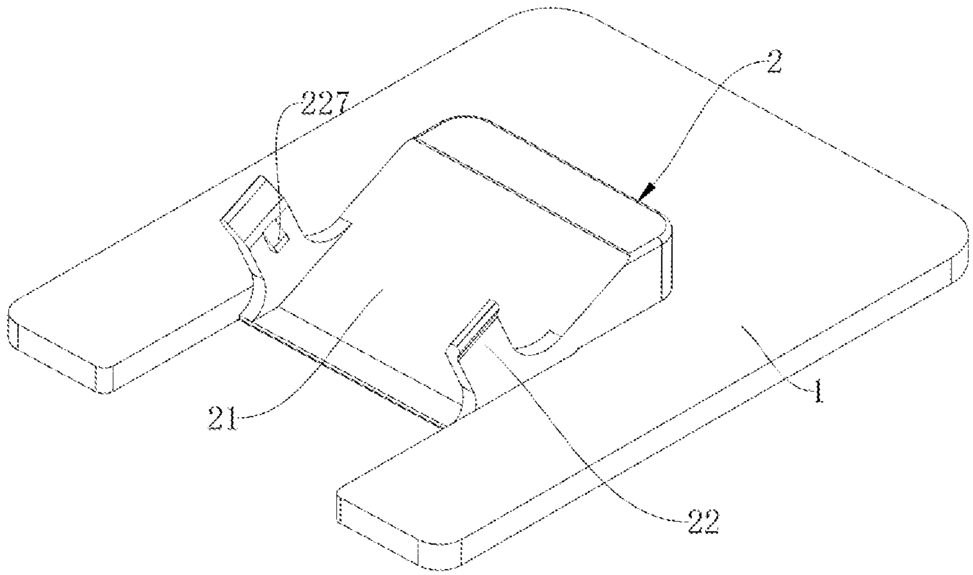
FIG. 13 is a structural schematic diagram of the auxiliary device according to a fourth embodiment of the present disclosure Reference numerals in the drawings: 10. cutting head; 101. fixing shell; 102. blade assembly; 103. auxiliary component mounting edge strips; 104. first protrusion positioning block; 105. second protrusion positioning block; 106. first positioning groove; 20. handheld holding rod; 201. control switch; 30. anti-slip sleeve pad; 301. raised patterns; 1. base; 11. slot; 12. first fixing portion; 13. first fixing hole; 2. cutting head fastener; 21. inclined surface; 22. fixing device; 221. limiting block; 2211. stop portion; 2212. guide portion; 222. stop groove; 223. locking elastic piece; 224. concave groove; 225. L-shaped groove; 227. locking block; 228. hook assembly; 23. second fixing portion; 231. first limiting portion; 24. first horizontal supporting portion; 241. reinforcing rib; 25. second horizontal supporting portion; 26. second limiting portion; 27. second fixing hole.

As shown in FIG. 13, the present disclosure further provides another embodiment of the auxiliary device, the fixing devices 22 are locking blocks 227 disposed on the inner side surface of each of the second fixing portions 23. Remaining structures of the auxiliary device are the same as the second embodiment, and are not repeated.

Specifically, when the locking blocks 227 are assembled in place, the locking blocks 227 are fixed in the first positioning groove 106, the first protrusion positioning block 104 and the second protrusion positioning block 105 are respectively located at two sides of each of the locking blocks 227, as so to limit the cutting head 10 to slide left and right on the inclined surface 21, and bottom portions of the locking blocks 227 may abut against top portions of the auxiliary component mounting edge strips 103, as so to limit the cutting head 10 to slide up and down on the inclined surface 21, and then the cutting head 10 may be locked on the inclined surface 21. In the embodiment, the second fixing portions 23 have performance of elastic resilience, and are matched with the locking blocks 227 to form elastic buckles, which is convenient both for processing and assembling.

The above embodiments are preferred embodiments of the present disclosure, but the embodiments of the present disclosure are not limited by the foregoing embodiments, and any other changes, modifications, substitutions, combinations, and simplification made without departing from the spirit and principle of the present disclosure should be equivalent replacement manners, which are all included within protection scopes of the present disclosure.

What is claimed is:

1. A carpet cutting system, comprising:

a carpet cutting device, comprising cutting head and a driving motor; wherein the driving motor is fixed at a rear end of the cutting head and is electrically connected to the cutting head; the cutting head comprises a fixing shell and a blade assembly, the blade assembly is disposed on the fixing shell, auxiliary component mounting edge strips are respectively disposed on two sides of a top portion of the fixing shell, and a first protrusion positioning block is disposed on a top portion of each of the auxiliary component mounting edge strips; and an auxiliary device, for use with the carpet cutting device, comprising a base and a cutting head fastener; wherein a slot is defined at one side of the base, and first fixing portions are disposed on two sides of the slot; the cutting head fastener comprises an inclined surface, second fixing portions, and fixing devices, the inclined surface is configured to support the fixing shell, the second fixing portions are located at two sides of the inclined surface, and the fixing devices are configured to fix the fixing shell on the inclined surface; the cutting head fastener is fixed on the base, the inclined surface is aligned with the slot, and when the cutting head is fixed on the inclined surface, the blade assembly is located in the slot;

wherein a first limiting portion is disposed at one end of an inner side surface of each of the second fixing portions; and wherein the fixing devices are limiting blocks disposed on the inner side surface of each of the second fixing portions, and a stop groove is defined between the first limiting portion and a corresponding one of the limiting blocks; a stop portion is disposed at a first end of each of the limiting blocks close to the first limiting portion, a guide portion is disposed at a second end of each of the limiting blocks.

2. The carpet cutting system according to claim 1, wherein each of the fixing devices further comprises an L-shaped groove and a locking elastic piece, the L-shaped groove is defined on the inner side surface of each of the second fixing portions, the locking elastic piece is located at a top portion of the L-shaped groove, and each of the limiting blocks is disposed on the locking elastic piece.

3. The carpet cutting system according to claim 2, wherein a concave groove is defined on an outer side surface of a connection of the locking elastic piece and each of the second fixing portions.

4. The carpet cutting system according to claim 1, wherein an included angle between the inclined surface and the base is ranged from 23° to 28°.

5. The carpet cutting system according to claim 1, wherein an included angle between the inclined surface and the base is 25°.

6. The carpet cutting system according to claim 1, wherein first fixing holes are defined on the base, and second fixing holes corresponding to the first fixing holes are defined on a bottom portion of the cutting head fastener.

7. The carpet cutting system according to claim 1, wherein the cutting head fastener is made of acrylonitrile butadiene styrene (ABS) materials, or polyphenylene sulfide (PPS) materials, or poly-ether-ether-ketone (PEEK) materials.

8. The carpet cutting system according to claim 1, wherein the cutting head fastener comprises a second limiting portion vertically disposed on a middle portion of a bottom portion of the cutting head fastener, a first horizontal supporting portion located at a first side of the second limiting portion and close to the blade assembly and a second horizontal supporting portion located at a second side of the second limiting portion and close to the driving motor; the second limiting portion abuts against an inner side surface of the slot, the first horizontal supporting portion is located in the slot, and the second horizontal supporting portion is fixed on the base.

9. The carpet cutting system according to claim 8, wherein the first horizontal supporting portion and the second horizontal supporting portion are both hollow cavities, and a plurality of reinforcing ribs are disposed in the hollow cavities.

10. The carpet cutting system according to claim 1, wherein a second protrusion positioning block is further disposed on the top portion of each of the auxiliary component mounting edge strips, and a first positioning groove is defined between the first protrusion positioning block and the second protrusion positioning block.

11. The carpet cutting system according to claim 10, wherein the carpet cutting device further comprises a handheld holding rod, the driving motor is disposed in the handheld holding rod, and a control switch is disposed on an outer surface of the handheld holding rod and is electrically connected to the driving motor.

12. The carpet cutting system according to claim 10, wherein an anti-slip sleeve pad is sleeved on the handheld holding rod, and a plurality of raised patterns are defined on the anti-slip sleeve pad.

* * * * *